United States Patent

White et al.

[11] Patent Number: 5,845,836
[45] Date of Patent: Dec. 8, 1998

[54] FRICTION WELDING NON-METALLICS TO METALLICS

[75] Inventors: Dawn Roberta White, Ann Arbor; Richard Lawrence Allor, Livonia; John Scott Badgley, Garden City, all of Mich.; Jerald Edward Jones, Golden, Colo.

[73] Assignee: Ford Global Technologies, Inc., Dearborn

[21] Appl. No.: 919,734

[22] Filed: Aug. 28, 1997

Related U.S. Application Data

[62] Division of Ser. No. 498,495, Jul. 5, 1995, Pat. No. 5,735,446.

[51] Int. Cl.$^6$ .............................. H01R 9/00; B23K 20/12
[52] U.S. Cl. ..................... 228/56.3; 228/254; 428/929; 439/876
[58] Field of Search ................................ 228/56.3, 114.5, 228/254; 439/876; 428/901, 929; 29/879, 885

[56] References Cited

U.S. PATENT DOCUMENTS

| | | | |
|---|---|---|---|
| 4,215,235 | 7/1980 | Kaufman | 439/876 |
| 5,410,452 | 4/1995 | Sinclair et al. | 361/791 |
| 5,451,174 | 9/1995 | Bogursky et al. | 439/876 |
| 5,607,313 | 3/1997 | Nyman | 439/876 |

*Primary Examiner*—Samuel M. Heinrich
*Attorney, Agent, or Firm*—Joseph W. Malleck

[57] ABSTRACT

An aluminum clip useful for being bonded to glass and serving as a terminal for an electrical lead circuit in or on such glass, comprising: an aluminum-based body having a cup shape. The cup shape having a substantially flat surface; an ultra thin pad of noble metal adhered to the substantially flat surface, the pad presenting a surface roughness in the range of 1–5 microns.

1 Claim, 2 Drawing Sheets

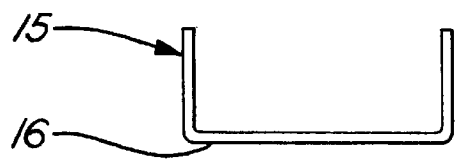
FIG.2
FIG.3
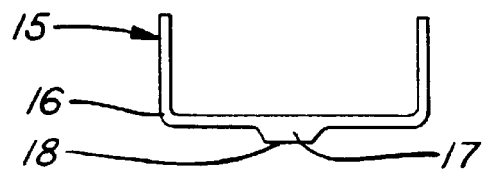
FIG.4
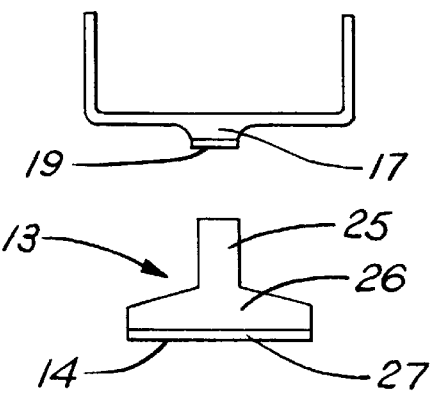
FIG.5
FIG.6
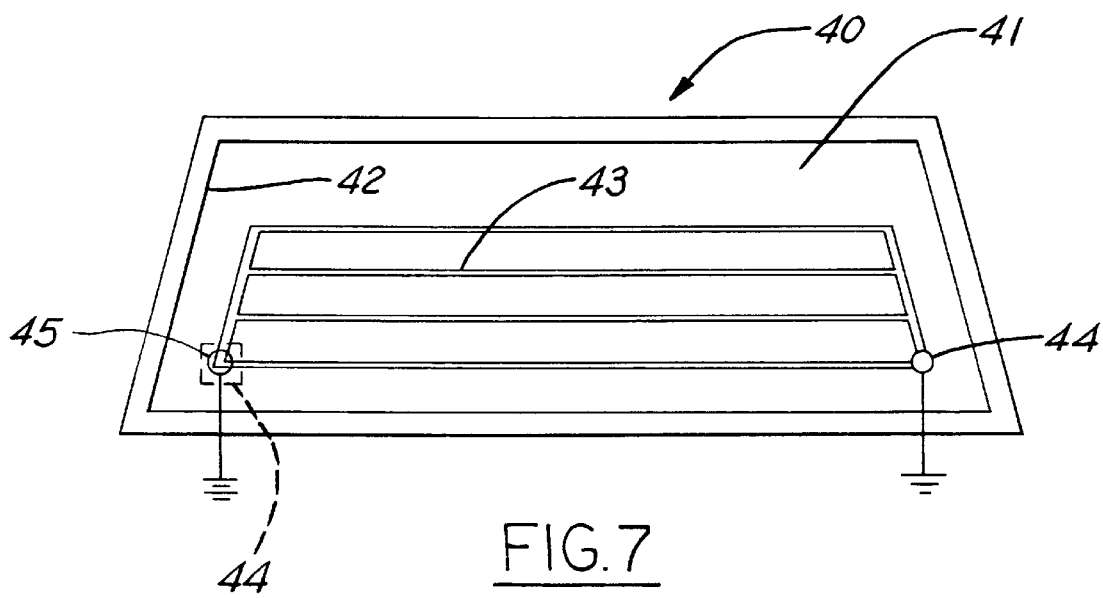
FIG.7

FRICTION WELDING NON-METALLICS TO METALLICS

This is a divisional of application Ser. No. 08/498,495 filed Jul. 5, 1995, now U.S. Pat. No. 5,735,446.

BACKGROUND OF THE INVENTION

1. Technical Field

This invention relates to the technology of friction welding or friction soldering, and more particularly to bonding conductive metallic members to fragile non-metallic parts, such as glass.

2. Discussion of the Prior Art

The earliest use of friction welding was to merge together two stiff conductive metal parts, such as two rods, one being rapidly rotated while it was pressed with a linear forging force against the end of the other rod end that remained relatively stationary; this caused interactive friction to melt the mating end surfaces. Recrystallization to a solid metallic joint occurred upon removal of the rotary-forging force. Sometimes a meltable solder was placed adjacent to the friction generating surfaces to be the melted as a substitute for melting the surface of the parts; such meltable solder, when recrystallized, created the bond between the parts.

Friction welding was adapted to the electrical industry. A conductive lead pin was rotated and forged to a conductive plug or head (see U.S. Pat. No. 4,542,843). Particular care had to be taken to allow the plug to rotate with the pin when the metallic interface between the pin and plug began to melt. In some cases the rotary motion was replaced by a vibrating motion, provided one member or part was soft and ductile enough to be deformed by pressing of the tool therebetween and thus ensure a frictional interengagement at a desirable location (see U.S. Pat. No. 5,288,006).

A special problem in the automotive industry which has never been addressed by the technology of friction welding is the need for joining terminals of electrical wires or leads that are embedded in glass windows, such as a vehicle windshield, backlite (the rear window) or body glass. Such wires can serve as a radio or cellular phone antenna, heater, security circuit, or keyless entry means. Such terminals may be a conductive clip arranged at a location on the perimeter of the glass which receives the end of a wiring harness that will extend into the vehicle interior to be operative. The clips are currently bonded to the glass by adhesives, or are soldered using hot air, flame, resistance heating, or other external heating methods that risk cracking the glass.

SUMMARY OF THE INVENTION

It is an object of this invention to provide a more effective and economical method of bonding metal members to a flat or curved fragile non-conductive member, such as glass, by the use of inertial energy.

More specifically, the invention is a method of inertial bonding of a conductive metallic member to a fragile non-conductive member, comprising: (a) depositing a thin adherent conductive pad onto the fragile member to present a first friction creating surface; (b) forming the conductive metallic member with a second friction mating surface conforming essentially to the first friction creating surface; (c) bringing the first and second friction surfaces together with high relative movement transverse to the surfaces and with a gradually increasing forging force along an axis perpendicular to the surfaces to generate sufficient frictional heat there between to effect at least a galling or smearing of melted particles of said surfaces; and (d) abruptly ceasing the relative rotation and increasing forging force upon the attainment of such melted particles at the engaging interface between the surfaces.

Another aspect of this invention is an automotive body glass product, comprising: (a) a laminated glass panel having its perimeter painted to obscure the presence of applied adhesives; (b) electrical leads on or in said glass and having one or more lead terminals; (c) an ultra thin pad of noble metal deposited onto a small zone of the glass in connection with at least one terminal; and (d) a conductive metal clip having at least a dimple thereon bonded to the pad by inertial welding of the dimple and noble metal pad material.

Yet still another aspect of this invention is an aluminum clip, useful for being bonded to glass and useful as a terminal for an electrical lead circuit in or on such glass, comprising: an aluminum-based body having a cup shape, said cup shape having a bottom with a substantially flat surface, and an ultra thin pad of noble metal adhered to said substantially flat surface, said pad presenting a surface roughness in the range of 1–5 microns.

BRIEF DESCRIPTION OF THE DRAWINGS

FIGS. 2–6 are various embodiments of conductive clips that may be utilized in constituting the metallic member that is to be bonded to the fragile glass; and FIG. 7 is an elevational schematic view of a glass backlite for an automotive vehicle illustrating the placement of wires in the glass (i.e., by silk screening theron a noble metal) and the use of a terminal at the end of the conductive path which deploys the inertial bonding of the conductive clip to the glass backlite.

DETAILED DESCRIPTION AND BEST MODE

Figure 1:
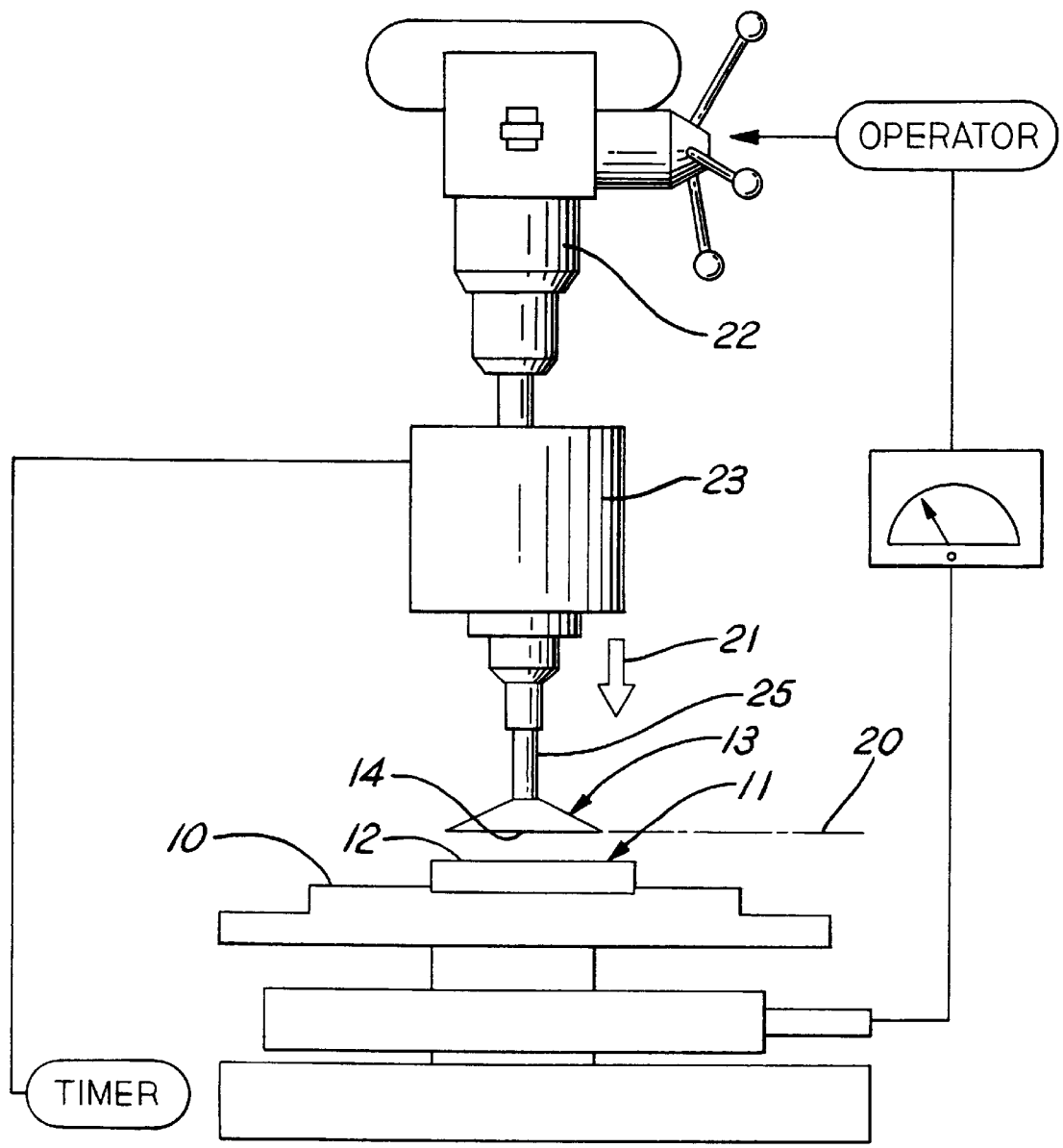
FIG. 1 is a schematic illustration of the apparatus utilized in carrying out the method of this invention.

The method of this invention is useful in attaching electrical leads to the surface of glass, ceramics, polymers, or other non-metallic material. The method thus requires preparation of the surfaces to be bonded. First the fragile member 10 (glass) is prepared by the deposition of the thin adherent conductive pad 11 onto the fragile member 10 to present a first friction creating surface 12. This is accomplished by coating the glass with preferably a silver based ceramic paint to form the pad. The ceramic paint can be applied by various methods and baked to form an electrical connection for any electrical or electronic device that may be attached to or embedded in the non-metallic material. The formation of the pad is by a surface mounting method and must be distinguished from any method that requires the imposition of a hole into the surface of the non-metallic material.

The pad can be constituted of any noble metal (such as iridium, palladium, rhodium, copper, silver and gold). It is important the conductive pad not be readily oxidizable either when exposed to the environment or when baked later to create a bond to the glass. The thickness of the pad is extremely thin, such as in the range of 0.015–0.025 inches. The exposed pad surface 12 should preferably be flat, but because of its thinness, it can conform to the character of the glass upon which it is being deposited and therefore may experience a slight curvature.

Next a conductive metal member 13 is formed with a second friction mating surface 14 conforming essentially to the first friction creating surface 12. The conductive metal member may take form of a metallic component 25 having a flanged bottom 26 presenting an enlarged float joining surface as shown in FIG. 1. Such joining surface should be symmetrical about the axis of rotation of the component during inertial welding or soldering. The component 25 may have a solder layer 27 applied over the bottom 26 which in turn will present the friction mating surface 14 (as shown in FIG. 6). Upon generation of frictional heat when the surfaces 14 and 12 are brought together, at least the surface of solder 27 will melt and form a bond when solidified. The conductive metal member may also consist of an aluminum clip axisymmetrically shaped to present a friction mating surface 14 on its bottom, without additional solder, this may be a clip formed as a hollow member 15 with a bottom cup, shaped portion 16 (as shown in FIG. 4). The hollow cup-shaped member may also be used with a solder layer 30 spread across the bottom of the cup-shaped member (as shown in FIG. 3), which solder will melt from the frictionally generated heat and resolidify to form a joint between the members. The hollow cup-shaped member 15 preferably is dimpled at 17 to form an exposed dimpled surface 18. The dimple is generally the same size as the thin noble metal pad (as shown in FIG. 4). The surface 18 of the dimple may be further coated with a soldered material 19 such as in the thickness range of 0.35–0.70 mm (as shown in FIG. 5) to present a friction mating surface. The solder material presents the friction mating surface 14. The solder material can be selected from a broad range of solders, including solders not usually appropriate for glass to metal joints because of the solder's strengths and melting points. The use of inertial soldering lowers residual stresses and allows a wider range of soldering materials.

To carry out the joining process, the connecting lead or clip is rotated by a motor 22 connected to an electric clutch mechanism 23, at a rotational velocity of at least 1700 rpm and as high as 5000 rpm or more. It is important that the surface 14 of the connecting lead or dimpled clip be maintained in a rotary plane 20 that is generally parallel to the surface 12 of the noble metal pad. The rotating connection lead is then lowered to gradually establish contact, with the noble metal pad. The lowering is carried out with a forging load 21 of 50–2000 psi depending upon the character of the materials used. The forging force is applied in a direction perpendicular to the surfaces to be joined (14, 12) thereby to thrust the two surfaces together. This is carried out for a precise momentary period of time to allow the friction, created between the two surfaces, to generate sufficient heat to melt a sufficient number of surface particles that will allow for at least galling or smearing of the melted particles across the interengaging surfaces.

The interengagement and generation of frictional heat is then abruptly brought to an end upon the initiation of such melting. The clutch 23 is disengaged and a brake 24 applied to stop the rotation of the connection lead or clip 13 within a time period of less than that required for one revolution of the lead or clip such as typically 0.1 second. The force, applied perpendicular to the joint surfaces, is maintained until the joint has cooled sufficiently to solidify either the liquid solder, if employed, or the melted surface particles. The joint then is complete.

The invention works on the principle of inertial friction heating of the solder or interengaging surfaces. Since a thin layer of the solder or interengaging surfaces is heated very rapidly and then cooled quickly, there is insufficient heat to damage the non-metallic glass material. While the process is better suited to certain solder compositions, it has been tested successfully with a variety of commercial solders, including lead-free solders.

This invention has particular utility in creating a new product in the form of an automotive backlite as shown in FIG. 7. The backlite 40 has a laminated glass panel 41 provided with a perimeter 42 that is painted to obscure the presence of applied adhesives used to install the backlite in the vehicle. The paint usually contains ingredients such as lead or zinc, which interfere with bonding of the silver pad or conductive metal member to the glass by conventional methods such as resistance or induction heating, hot air, or flame heating. Such interference is created by the pressence of lead or zinc oxides. The glass panel 41 has conductive leads 43 and one or more conductive lead pads 44 terminating at one end of the leads. The pad is formed of an ultra thin layer of nobel metal which can be deposited directly onto the painted perimeter 42 of the glass panel. An axisymmetric conductive metal clip 45 (such as the dimpled clip) shown in FIG. 4, is inertially welded to the pad. The friction between the dimple and pad generates sufficient heat to allow the mating surfaces to bond and the painted surface of the perimeter does not interfere with the bond between the silver pad and the conductive clip or lead, because the oxides are removed by the friction at the laying surfaces during joining.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. An aluminum clip, useful for bonding to glass and useful as a terminal for an electrical lead circuit in or on such glass, comprising:
    (a) an aluminum-based body having a cup shape, said cup shape having a bottom with a substantially flat surface; and
    (b) an ultra thin pad of noble metal adhered to said substantially flat surface, said pad presenting a surface roughness in the range of 1–5 microns.

* * * * *